United States Patent Office 3,657,273
Patented Apr. 18, 1972

3,657,273
ADAMANTANE-1,3-DICARBOXAMIDES
Carl Peter Krimmel, Wauconda, Ill., assignor to
G. D. Searle & Co., Chicago, Ill.
No Drawing. Continuation-in-part of application Ser. No.
631,121, Apr. 17, 1967. This application May 1, 1970,
Ser. No. 33,956
Int. Cl. C07c *103/00;* C07d *27/04*
U.S. Cl. 260—326.3                        5 Claims

ABSTRACT OF THE DISCLOSURE

N,N' - dialkylaminoalkyl adamantane - 1,3-dicarboxamides and adamantane-1,3-diacetamides and also the corresponding cyclic amino compounds are described herein. They are anti-bacterial, anti - fungal, anti - algal, antiprotozoal, and anti-inflammatory agents. They also show activity as analgesics and anti-hypertensives. The compounds are prepared by the reaction of adamantane-1,3-dicarbonyl chloride or adamantane-1,3-diacetyl chloride with aminoalkylamines.

---

The present application is a continuation-in-part of application Ser. No. 631,121, filed Apr. 17, 1967, now abandoned.

The present invention relates to a group of amides of adamantane-1,3-dicarboxylic acid and adamantane-1,3- diacetic acid. More particularly, it relates to a group of water-soluble compounds having the following general formula

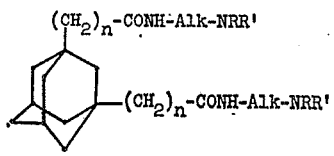

wherein Alk is lower alkylene separating the nitrogens attached thereto by at least 2 carbon atoms; n is a whole number between 0 and 1 inclusive; and NRR' is selected from the group consisting of di(lower alkyl)amino and cyclic amino. Examples of cyclic amino radicals are 1-pyrrolidinyl, piperidino, hexamethylenimino, morpholino, and 4-methyl-1-piperazinyl.

The lower alkylene radicals referred to above contain up to 6 carbon atoms and can be exemplified by ethylene, propylene, trimethylene, tetramethylene, pentamethylene, and hexamethylene. The lower alkyl radicals referred to above likewise contain up to 6 carbon atoms and can be exemplified by methyl, ethyl, propyl, isopropyl, butyl, and the like.

The organic bases of this invention form pharmaceutically acceptable salts with a variety of organic and inorganic acids. Such salts are formed with acids such as sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids. They also form quaternary ammonium salts with a variety of organic esters of sulfuric, hydrohalic, and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, methyl benzenesulfonate, ethyl toluenesulfonate, ethylene chlorohydrin, propylene chlorohydrin, allyl bromide, methallyl bromide, and crotyl bromide.

The compounds of this invention are conveniently prepared by the reaction of an amine of the formula H₂N—Alk—NRR', wherein Alk and —NRR' are defined as above, with an adamantanedicarboxylic acid halide or an adamantanediacetic acid halide. The acid chloride is preferred for this reaction. The reaction is carried out in an inert solvent such as benzene or a tertiary amine such as pyridine. In some instances, it may be necessary to apply external heat to the mixture in order for more complete reaction to take place.

The compounds of this invention are useful because of their anti-biotic activity against a variety of organisms. Thus, they inhibit the growth of bacteria such as *Diplococcus pneumoniae*, fungi such as *Trichophyton mentagrophytes* and *Candida albicans*, algae such as *Chlorella vulgaris*, and protozoa such as *Trichomonas vaginalis*. The present compounds can thus be combined with various known excipients and adjuvants in the form of dusts, solutions, suspensions, ointments and sprays to provide compositions useful for disinfecting purposes.

The present compounds also possess activity as anti-inflammatory agents, analgesics, and anti-hypertensive agents.

The following examples are presented to further illustrate the present invention; they should not be construed as limiting it in spirit or in scope. In these examples, quantities by weight are indicated in grams, quantities by volume are indicated in milliliters, and temperatures are indicated in degrees centigrade (° C.).

EXAMPLE 1

A mixture of 4.5 grams of adamantane-1,3-dicarboxylic acid and 40 ml. of thionyl chloride is refluxed on a steam bath for 5 hours. The mixture is then distilled on a steam bath at reduced pressure to remove excess thionyl chloride. Azeotropically dried benzene is added to the residue and distillation at reduced pressure is resumed to remove any final traces of thionyl chloride. The resultant cooled residue is crude adamantane-1,3-dicarbonyl chloride.

The acid chloride obtained above is cooled and dissolved in 10 ml. of dry pyridine. This pyridine solution is stirred and a solution of 4.6 grams of 2-diethylaminoethylamine in 10 ml. of dry pyridine is added slowly. The pyridine is then removed from the solution under reduced pressure and the resultant orange-brown residue is dissolved in 150 ml. of distilled water. The resultant solution is treated with charcoal and filtered through diatomaceous earth. The resulting filtrate is saturated with potassium carbonate. An emulsion forms and is extracted with anhydrous ethyl ether. The ether solution is dried over anhydrous sodium sulfate and the ether is evaporated. The resulting residue is recrystallized from n-hexane. It may be desirable to seed the n-hexane solution obtained to prevent emulsion formation. The product obtained in this way is N,N'-bis (2 - diethylaminoethyl)adamantane - 1,3-dicarboxamide melting at about 76–79° C. This compound is water-soluble and has the following formula

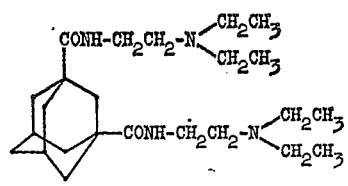

EXAMPLE 2

Adamantane-1,3-dicarbonyl chloride is prepared from 9.0 grams of adamantane-1,3-dicarboxylic acid according to the procedure described in Example 1. The crude acid chloride obtained is dissolved in 20 ml. of dry pyridine and reacted with a solution of 10.2 grams of 3-dimethylaminopropylamine in 20 ml. of dry benzene. The resulting mixture is distilled under reduced pressure to remove the pyridine and the residual product is dissolved in 200 ml. of distilled water, treated with charcoal, and filtered through diatomaceous earth. The filtrate obtained is saturated with potassium carbonate and extracted with benzene. The benzene extract is dried over anhydrous potassium carbonate and treated with charcoal, and the solvent is evaporated on a steam bath. The resulting syrupy residue is diluted with n-hexane until crystals separate. These are collected by filtration and washed with n-hexane before recrystallization from n-hexane to give N,N'-bis(3-dimethylaminopropyl)adamantane - 1,3 - dicarboxamide melting at about 96–98° C. The addition of 5 mg. of this compound to an agar plate inoculated with *Candida albicans* inhibits the growth of this organism.

EXAMPLE 3

The procedure of Example 2 is repeated using the acid chloride from 9.0 grams of adamantane-1,3-dicarboxylic acid in 20 ml. of dry pyridine, and 12.8 grams of 1-(3-aminopropyl)pyrrolidine in 20 ml. of dry pyridine. The product, obtained as white flat needles, is N,N'-bis[3-(1-pyrrolidinyl)propyl]adamantane - 1,3 - dicarboxamide melting at about 100–102° C.

EXAMPLE 4

A solution of 2.2 grams of N,N'-bis[3-(1-pyrrolidinyl)propyl]adamantane-1,3-dicarboxamide in 20 ml. of 2-butanone is prepared by gentle warming on a steam bath. Then, 4.4 grams of ethyl bromide is added and the resulting solution is refluxed for 2 hours. The resulting hard brittle solid reaction product is comminuted, filtered, and air dried. This gives N,N'-bis[3-(1-pyrrolidinyl)propyl] adamantane-1,3-dicarboxamide bis-ethobromide hydrate melting at about 224–237° C.

EXAMPLE 5

1-(3-aminopropyl)piperidine, 1 - (2-aminoethyl)-hexamethylenimine, 4-(2-aminoethyl)morpholine, and 1-(3-aminopropyl)-4-methylpiperazine are each reacted with adamantane-1,3-dicarbonyl chloride according to the procedure described in Example 2 to give, respectively, N,N'-bis(3-piperidinopropyl)adamantane-1,3-dicarboxamide,
N,N'-bis(2-hexamethyleniminoethyl)adamantane-1,3-dicarboxamide,
N,N'-bis(2-morpholinoethyl)adamantane-1,3-dicarboxamide; and
N,N'-bis[3-(4-methyl-1-piperazinyl)propyl]adamantane-1,3-dicarboxamide melting at about 126–129° C. after recrystallization from heptane.

EXAMPLE 6

Adamantane-1,3-diacetic acid is converted to the acid chloride using thionyl chloride and the procedure in the first paragraph of Example 1. The acid chloride is then reacted with 2-diethylaminoethylamine according to the procedure described in the second paragraph of Example 1 to give N,N'-bis(2-diethylaminoethyl)adamantane-1,3-diacetamide.

What is claimed is:

1. A member selected from the group consisting of compounds of the formula

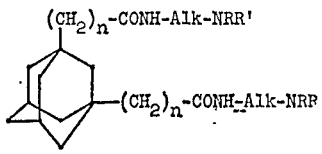

wherein Alk is lower alkylene separating the nitrogens attached thereto by at least 2 carbon atoms; *n* is a whole number between 0 and 1 inclusive; and —NRR' is selected from the group consisting of di(lower alkyl)amino, 1-pyrrolidinyl, piperidino, hexamethylenimino, morpholino, and 4-methyl-1-piperazinyl; and the acid addition and alkyl halide quaternary ammonium salts thereof.

2. A compound according to claim 1 which is N,N'-bis(2-diethylaminoethyl)adamantane-1,3-dicarboxamide.

3. A compound according to claim 1 which is N,N'-bis(3-dimethylaminopropyl)adamantane - 1,3 - dicarboxamide.

4. A compound according to claim 1 which is N,N'-bis[3-(1-pyrrolidinyl)propyl]adamantane - 1,3 - dicarboxamide.

5. A compound according to claim 1 which is N,N'-bis[3-(1-pyrrolidinyl)propyl]adamantane - 1,3 - dicarboxamide bis-ethobromide.

References Cited

UNITED STATES PATENTS 3,534,086   10/1970   Narayanan et al. _____ 260—490

ALEX MAZEL, Primary Examiner

J. A. NARCAVAGE, Assistant Examiner

U.S. Cl. X.R.

260—239 BF, 247.2 A, 268 PC, 294 A, 557 B; 424—244, 248, 250, 267, 274, 320